United States Patent [19]

Booth

[11] 3,913,019

[45] Oct. 14, 1975

[54] DOUBLE QUADRATURE FM RECEIVER

[76] Inventor: Ray Booth, Rte. No. 3, Box D5, Terrell, Tex. 75160

[22] Filed: Sept. 9, 1974

[21] Appl. No.: 504,501

[52] U.S. Cl. ................ 325/346; 325/419; 325/435; 329/110

[51] Int. Cl.$^2$............................................ H03D 7/16

[58] Field of Search ........... 325/344, 345, 346, 419, 325/433, 435; 329/110, 122, 123, 112

[56] References Cited

UNITED STATES PATENTS

| | | | |
|---|---|---|---|
| 3,217,262 | 11/1965 | Battail et al. | 329/110 |
| 3,435,344 | 3/1969 | Blair et al. | 325/346 X |
| 3,504,292 | 3/1970 | Battail et al. | 329/112 |
| 3,544,899 | 12/1970 | Gusyatinsky et al. | 325/346 |

*Primary Examiner*—Benedict V. Safourek
*Attorney, Agent, or Firm*—Warren H. Kintzinger

[57] ABSTRACT

An FM receiver employing dual signal demodulation channels, each receiving an incoming frequency modulated carrier. A first channel conventionally recovers the intelligence signal modulated on the incoming carrier. The second channel has a frequency conversion circuit including a mixer and an intection oscillator, the latter being frequency modulated by feedback of the intelligence signal recovered in the first channel. The injection oscillator deviation is caused to be 180° out of phase with the deviation imparted to the incoming carrier, and the resulting second channel intermediate frequency signal is demodulated to provide the receiver intelligence output signal.

7 Claims, 11 Drawing Figures

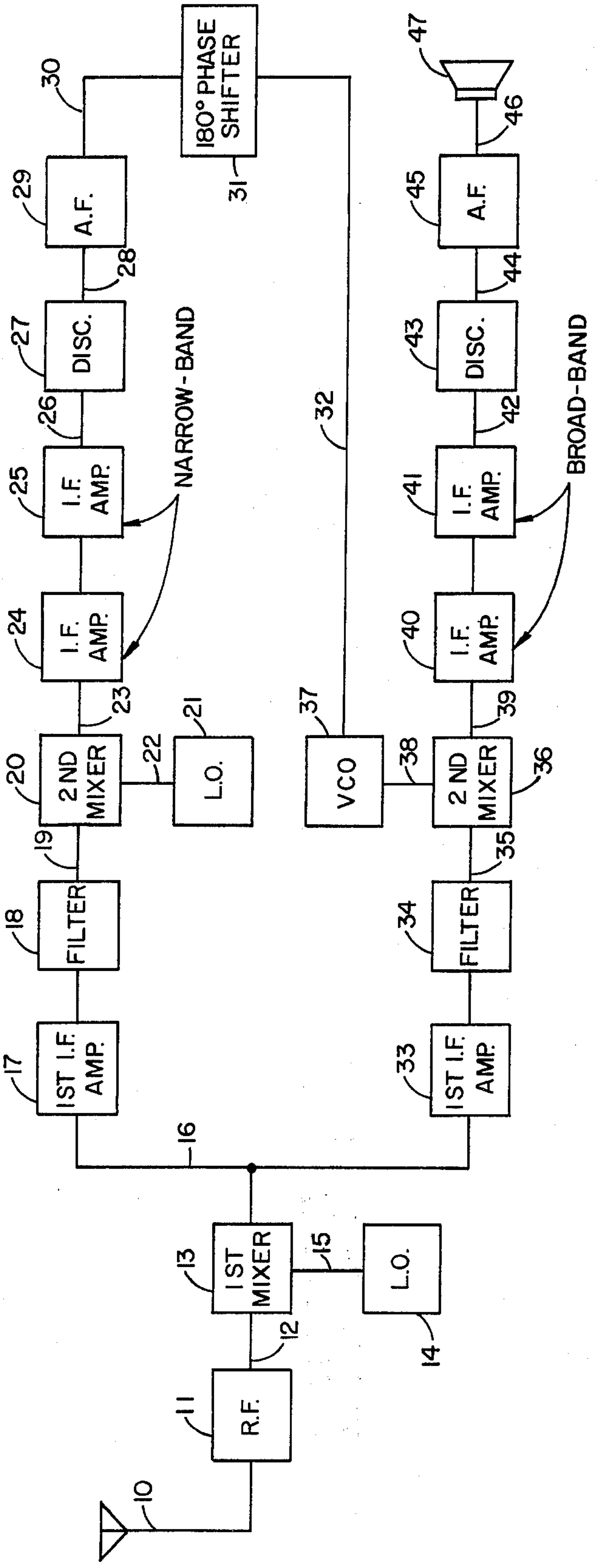
R.F.
1ST MIXER
L.O.
1ST I.F. AMP.
FILTER
2ND MIXER
L.O.
I.F. AMP.
I.F. AMP.
NARROW-BAND
DISC.
A.F.
180° PHASE SHIFTER
VCO
1ST I.F. AMP.
FILTER
2ND MIXER
I.F. AMP.
I.F. AMP.
BROAD-BAND
DISC.
A.F.

DOUBLE QUADRATURE FM RECEIVER

This invention relates generally to frequency modulation (FM) communications and more particularly to an improved FM receiver for use in reception of narrow band FM signals.

FM communication systems comprise receiving means for recovering an intelligence which is frequency modulated on a transmitted carrier. The amplitude (dynamics) of the modulated intelligence is transmitted as frequency deviation of the carrier from its center frequency, while the tonal (fidelity) defining characteristics are transmitted as the rate of change of the frequency deviation (swing) of the carrier center frequency.

The deviation of the transmitted carrier in a given communication system defines a modulation index M, which is expressed as the ratio of the instant frequency deviation of the carrier to the modulating frequency producing that deviation, and, in general, a greater deviation permits transmission and reception of signals having a wider frequency range and greater dynamic range. The deviation in a given system defines the bandwidth of the system and thus the spectrum channel separation as concerns carrier center frequency.

In certain types of FM communication systems the fidelity capability may exceed the need, and wasteful spectrum allocation or channel separations might be obviated by reduced frequency deviation.

The object of the present invention is thus the provision of an improved FM receiver wherein the deviation normally supplied by the transmitted wave is increased at the receiver, such that the deviation imparted at the transmitter may be reduced without impairing the receiver sensitivity.

A further object of the present invention is the provision of means, in an FM receiver, of increasing the frequency deviation of the signal applied to the discriminator thereof over and above that which would be supplied in conventional FM receivers.

A still further object of the invention is the provision of an FM receiver having increased dynamic range capabilities as compared to conventional FM receivers.

Features of the invention useful in accomplishing the above objectives include, in an FM receiver, dual frequency mixer circuitries to which a received frequency modulated carrier of i-f signal may be commonly applied. Each mixer circuitry comprises an injection oscillator. a first signal demodulating channel comprises a frequency discriminator operating about a center frequency established by a mixer and an associated injection oscillator. A second signal demodulating channel comprises a frequency discriminator likewise operating about the center frequency established by a mixer and an associated injection oscillator. The detected modulation signal recovered by the first channel is applied to frequency modulate the injection oscillator in the second channel with appropriate phasing to cause the frequency deviation of the second channel injection oscillator to be 180° out of phase with the deviation on the incoming FM signal. The second discriminator thereby sees an FM signal with deviation introduced by the transmitter increased by that supplied by the second channel injection oscillator, and is utilized as the receiver output.

A specific embodiment representing what is presently regarded as the best mode of carrying out the invention is illustrated in the accompanying single-FIGURE drawing that represents a functional block diagram of an improved FM receiver in accordance with the present invention, as applicable to a double conversion FM receiver.

A frequency modulated carrier is received by antenna 10 and applied to an *r-f* amplifier 11. A first conversion is shown by the inclusion of a first mixer 13 which receives the output 12 of the r-f amplifier 11 and the output 15 of a first local oscillator 14 as respective inputs. The output 16 of first mixer 13 thus comprises a first intermediate frequency signal.

The first i-f signal 16 is applied as input to each of two signal channels. A first *i-f* amplifier 17 receives the first mixer output 16. Amplifier 17 comprises the input stage of a first signal channel comprising an essentially conventional FM receiver circuity as depicted in the upper portion of the FIGURE. The output of amplifier 17 is applied through i-f fitter 18 to provide a first input to second mixer 20. Local oscillator 21 provides an injection signal 22 for mixer 20. The output 23 from second mixer 20 comprises a second i-f signal which is applied through i-f amplifiers 24 and 25 as an input to a frequency discriminator 27. The output 28 from discriminator 27, the recovered modulation intelligence, is applied to an output amplifier 29, which, in an audio communication system, would comprise an audio amplifier.

In accordance with the present invention, the output 30 from audio amplifier 29, rather than be applied to a speaker as in the conventional FM receiver art, is fed back into a second signal channel, shown in the lower portion of the FIGURE.

The second signal channel, as illustrated in the FIGURE, is basically like that of the first, in that the output 16 of the first mixer 13 in the receiver front-end is applied through a first i-f amplifier 33 (like that of amplifier 17 in the upper channel) with the output of amplifier 33 being applied through a first i-f filter 34 to provide an input 35 to a second mixer 36. The output 39 of mixer 36 is applied through i-f amplifiers 40 and 41 to provide an input 42 to a frequency discriminator 43. The output 44 of the discriminator 43 is applied through an audio amplifier 45 to a utilization means, such as speaker 47.

The lower channel is unlike that of the upper channel in that the injection oscillator of this channel provides a frequency modulated injection signal 38 to second mixer 36. The injection signal for the second i-f conversion in the lower channel comprises a carrier signal at the second i-f frequency which is frequency modulated in accordance with the modulation intelligence recovered in the upper channel, i.e., by the audio output signal 30 of the upper channel.

Accordingly, the injection oscillator 37 of the lower channel may comprise a voltage controlled oscillator, the output frequency of which is a function of the audio output 30 of the upper channel. The block diagram illustrates a functional 180° phase shift block 31 in the line between output amplifier 29 of the upper channel and the voltage controlled oscillator 37. Operationally this may be implemented by means causing the frequency deviation of the voltage controlled oscillator 37 to be 180° out of phase with the deviation on the received FM signal. The feedback 32 from the upper channel is thus phased such that, as the deviation on the incoming FM signal swings positive, the deviation on the voltage controlled oscillator output 38 swings negative.

Since second mixer 32 of the lower channel receives a frequency modulated i-f input carrier signal 35 with deviation defined by the received r-f carrier wave, and receives an injection signal comprising a frequency modulated VCO carrier with deviation defined by the received r-f signal, but oppositely phased, the deviation seen by the discriminator 43 in the lower channel exceeds that of the incoming *r-f* signal. In effect, discriminator 43 sees an FM signal with the deviation supplied by the transmitter, plus the deviation supplied by the voltage controlled oscillator 37.

Defining the output 16 from the receiver first mixer as $f_1+fd$, where $f_1$ is the first i-f carrier and $fd$ is the deviation imposed at the transmitter, and the output from voltage controlled oscillator 37 as $f_2-fd_1$ (deviation oppositely phased), the difference output from second mixer 36 then becomes $(f_1+fd)-(f_2-fd_1)=(-f_1-f_2)+fd+fd_1$, with $(f_1-f_2)$ being the second *i-f* carrier frequency. The output of the second mixer 20 in the upper channel is conventionally $(f_1+fd)-(f_2)=(-f_1-f_2)+fd$. Since the output of the second mixer is subsequently demodulated to provide the receiver output 46, the discriminator 43 in this output channel sees an *i-f* carrier with deviation $fd$ supplied by the transmitter increased by the deviation $fd_1$ supplied by the lower channel injection oscillator 37, with an attendent increase in sensitivity as concerns the receiver output.

The upper channel depicted in the FIGURE need have an *i-f* bandwidth only wide enough to accommodate the deviation on the incoming carrier signal, and, therefore, a narrow bandwidth compared to that of the lower channel where an i-f bandwidth sufficiently wide to accommodate the increase in deviation imparted by injection oscillator 37, would be designed into the i-f amplifiers and discriminator.

By using the above-described method for FM reception in communications systems, the deviation, and therefore the bandwidth of the FM transmitter, can be reduced without sacrificing sensitivity in the receiver, giving rise to a conservation of spectrum space, and thus, especially in cartain wide bandwidth channel applications systems enjoyed in microwave communication portions of the spectrum, the possibility of extending the number of possible channels of communication.

Whereas this invention is herein illustrated and described with respect to a particular embodiment hereof, it should be realized that various changes may be made therein without departing from essential contributions to the art made by the teachings hereof.

I claim:

1. In an FM receiver, the method of demodulation to recover the intelligence frequency modulated on an incoming carrier signal comprising the steps of:

1. demodulating said incoming carrier signal in a first receiver channel to recover the modulation intelligence thereon,
2. applying said incoming frequency modulated carrier signal to a second receiver channel which includes a signal mixing means receiving said incoming signal and the output of a frequency modulated injection oscillator as inputs thereto,
3. frequency modulating said frequency modulated injection oscillator, utilizing the modulation intelligence signal received by said first channel as a modulating waveform, with the phasing of the modulation of said frequency modulated injection oscillator being such that the frequency deviation of the output signal therefrom is 180° out of phase with the frequency deviation of said incoming frequency modulated carrier signal, and
4. demodulating the output of said signal mixing means to recover the modulation intelligence thereon as an output from said FM receiver.

2. The demodulation method of claim 1, wherein the bandwidth of said first channel is defined to pass the intelligence defining modulation components of said incoming frequency modulated carrier signal, the bandwidth of said second channel being greater than that of said first channel and being defined in part by the sum of the deviation of said incoming carrier signal and the deviation of the frequency modulated injection oscillator signal of said second channel.

3. An FM receiver comprising first signal processing means to which an incoming frequency modulated carrier signal is applied as input and comprising signal conversion means including an injection oscillator to develope an i-f signal carrying the modulation intelligence imposed on said carrier signal, with said i-f signal being applied to demodulation means, the output of which comprises said modulation intelligence; second signal processing means comprising further signal conversion means including a further injection oscillator to develope an i-f signal, with said 1-f signal being applied to a further demodulation means, the output of which comprises the output of said receiver; said further injection oscillator comprising a frequency modulated oscillator; and feedback means applying the output of the demodulation means of said first signal processing means as a modulating signal input to said further injection oscillator, with said feedback being phased to effect a frequency deviation of the output of said further injection oscillator which is 180° out of phase with that of said incoming frequency modulated carrier signal.

4. The FM receiver of claim 3, wherein the i-f bandwidth of said first signal processing means passes only the frequency spectrum definitive of the modulation intelligence imposed on said incoming carrier signal, with the i-f bandwidth of said second signal processing channel exceeding that of said first channel and sufficient to pass a spectrum as increased by the i-f deviation imposed by the deviation of the output of said further injection oscillator.

5. The FM receiver of claim 4, wherein the frequency of the injection oscillator of said first channel equals the center frequency of said further injection oscillator in said second channel.

6. The FM receiver of claim 5, wherein said further injection oscillator comprises a voltage controlled oscillator, and said feedback means comprises means to shift the phase of the output of said first channel demodulation means by 180° as applied to frequency controlling means of said voltage controlled oscillator.

7. The FM receiver of claim 6, wherein said frequency controlling means is responsive to the output of said first channel demodulation means to impart a deviation of the frequency of said voltage controlled oscillator oppositely directed from that instantaneously existing on said incoming frequency modulated carrier signal.

* * * * *